3,457,075
SENSITIZED SHEET CONTAINING AN ORGANIC SILVER SALT, A REDUCING AGENT AND A CATALYTIC PROPORTION OF SILVER HALIDE
David A. Morgan, East Oakdale Township, Washington County, and Benjamin L. Shely, White Bear Lake, Minn., assignors to Minnesota Mining and Manufacturing Company, St. Paul, Minn., a corporation of Delaware
No Drawing. Continuation-in-part of application Ser. No. 362,928, Apr. 27, 1964. This application Dec. 27, 1967, Ser. No. 693,714
Int. Cl. G03c 1/10
U.S. Cl. 96—67          18 Claims

ABSTRACT OF THE DISCLOSURE

Light-sensitive films and papers for dry photography, which form high contrast images when exposed to a light-image and then uniformly moderately heated, contain minor amounts of photosensitive silver halide catalyst progenitor in catalytic proximity with major amounts of heat-sensitive oxidation-reduction image-forming reactants which react more rapidly under the influence of said catalyst. The catalytic effect is sufficient to produce gamma infinity values of .5 and higher.

---

This application is a continuation-in-part of our co-pending applications, Ser No. 362,928 filed Apr. 27, 1964, now abandoned, and Ser. No. 451,010 filed Apr. 26, 1965, as a continuation-in-part thereof, now abandoned.

This invention relates to the visible recording of light-images, and has particular reference to new and useful light-sensitive sheet materials and methods of making and using the same. The invention provides for the first time a commercially practical light-sensitive sheet material on which a high contrast, permanent, visible record may be developed by moderate uniform heating following exposure of the sheet to the light-image, a process which may be termed "dry photography." No liquids, vapors or other processing aids are required to obtain a permanent dense visible image. Virtually complete utilization of the entire quantity of image-forming material is attained in the fully exposed areas without undue darkening of the unexposed areas, merely by brief heat development after exposure to moderate quantities of light.

The preparation of sheet materials capable of forming a visible image by exposure to a light-image followed by heating has previously been attempted. Exemplary of one such approach are sheet materials based on diazonium compounds which decompose under exposure to ultra-violet radiation, one form of which is represented by U.S. Patent No. 2,703,756. Another approach employs a heat-induced color-forming condensation reaction, for example with an aromatic amine, of a free radical produced by exposure to ultraviolet radiation, as in U.S. Patent No. 3,042,517. An earlier form of sheet material, described for example in U.S. Patent No. 1,976,302, contains silver oxalate or the like which, after exposure to ultraviolet, is decomposed by heating. A more recently described prior art sensitive sheet utilizes a conventional light-sensitive silver halide in conjunction with a reducing agent, the two reacting at light-struck areas in the presence of moisture provided from a hydrated salt under the influence of heat.

Many of the prior art materials require exposure to intense ultraviolet radiation, or for long periods of time, in order to make possible the development of a visible image on heating. Some of them require extended heating, or heating at undesirably high temperatures. Some are unstable on prolonged storage, or produce poor quality or unstable images, or undergo further change in image or background areas on storage subsequent to imaging, or have other undesirable properties or attributes.

Another recently described sheet material employs a mixture of organic silver salt and organic reducing agent which by itself forms a coating that is substantially latent under ambient conditions. As described in Sorensen et al. U.S. Patent No. 3,152,904, the introduction of very small amounts of silver halide or other analogous photosensitive metal salt, either within the mixture or in a contacting separate layer, makes possible the creation of a visible image by exposure to a light-image followed by heating or by application of a solvent. But this sheet material, like those of the prior art mentioned above, suffers from the inability to provide images of desirably high visual contrast and to make possible a commercially practical process of dry photography.

In no case of which we are aware do these hereinbefore described materials produce a dense image upon heat development of an area which has first been briefly exposed to ordinary light, e.g. to not more than ten times the quantity of light required to provide a visible degree of change on such heat development.

The new and useful sheet material of this invention may be transparent or opaque; it may be supplied in roll form as a film or sheet stock, or it may be packaged and sold in pre-cut sheet form. This new sheet material combines a photo-sensitive means and a heat-sensitive means in intimate association in a stratum to provide a unique combination of heat and light sensitivity, the light-sensitive material upon light exposure serving greatly to increase the heat-reactivity of the heat-sensitive material throughout the exposed areas. The stratum may be a surfacing, or an under-layer or coating. Because of wide familiarity of the art with silver compounds, through their extensive use in photography, it has been found convenient to prepare sheet materials embodying this invention using such compounds, although it is to be understood that the invention is not limited thereto.

A specific embodiment of the invention provides a photosensitive copy-sheet product having a normally substantially latent coating which is capable of undergoing permanent visible change at light-struck areas on being briefly heated at moderately elevated temperatures. The sensitive layer contains a light-stable organic silver salt oxidizing agent, an organic reducing agent, and photosensitive silver halide, in a novel relationship resulting in a surprisingly high level of heat-sensitivity throughout the image areas after exposure to a light-image. As a result there is provided a light-sensitive coating having photographic capability. Visible images of photographic sharpness and of high visual contrast are produced within seconds by the simple process of exposing the sensitive sheet to a light-image and then to moderately elevated temperatures. Reversal images may be obtained, e.g. by heating the print in contact with a suitable receptor sheet containing organic silver salt.

The organic silver salt need not be completely insensitive toward light, but should at least be resistant to darkening under indoor illumination to an extent sufficient to prevent destruction or deterioration of copies during several days or weeks or desk-top storage, and may be almost totally resistant to visible change even under diffuse sunlight. A preferred class of salts having excellent stability under exposure to light is represented by the water-insoluble silver soaps of long chain fatty acids which are highly stable to light in the presence of moisture, such for example as silver behenate and silver stearate. The soaps are conveniently prepared by precipitation with silver nitrate solution from aqueous solutions of the alkali metal soaps of corresponding fatty acids, with or without coprecipitation of the fatty acid in any desired proportion. For transparent coatings the fatty acid content is restricted or omitted.

Heat-sensitive sheet materials based on organic silver salt oxidizing agents and organic reducing agents are described in Owen U.S. Patent No. 2,910,377, wherein are included silver behenate and silver stearate as well as the silver salts of a number of other organic acids, viz oleic, lauric, hydroxystearic, acetic, phthalic, terephthalic, butyric, m-nitrobenzoic, salicylic, phenylacetic, pyromellitic, p-phenylbenzoic, undecylenic, camphoric, furoic, acetamidobenzoic, and o-aminobenzoic. Other organic silver salts capable of providing similar effects include the silver salts of saccharin, benzotriazole, phthalazinone, 4'-n-octadecyloxydiphenyl-4-carboxylic acid, 10,12,14-octadecatrienoic acid, and benzoic acid. The silver salts of those organic acids which are water-insoluble and normally solid are preferred, since the by-products do not adversely affect the coating. The heat-reactivity with the organic reducing agents of silver salts of the shorter carbon chain fatty acids, such as silver butyrate, as well as many of the other salts listed, may be increased in accordance with the principles of the present invention; and sheet materials based on such compounds and combinations have been found to produce high contrast dense images when properly exposed and developed. Most or all of such sheets darken more or less rapidly under continued exposure to light, and images produced thereon, although useful for short periods, are therefore not permanent unless subsequently treated, e.g. with fixing agents; and the sheets containing the water-insoluble normally stable silver salts of long chain fatty acids, i.e. containing at least about twelve carbon atoms in the carbon chain, or other silver salts having generally good resistance to darkening under indoor illumination, are therefore greatly preferred.

The halide ion of the photosensitive silver halide may be supplied in any of a number of ways. One convenient procedure involves briefly exposing the surface of the organic silver salt particle or coating to the vapors of one or more halogen acids, the extent of the reaction being controlled by controlling both the concentration of the vapor and the time of exposure to the vapor. A preferred procedure involves the coating of any of various halogen-containing liquid solutions of known small concentration and in controlled amounts over the surface of a thin coating of the organic silver salt on a suitable substrate, followed by removal of the solvent if desired, whereby silver halide is formed in situ throughout the surface of the coating of the organic silver salt or the like.

The solution method of applying the halide ion is particularly useful in the preparation of light-sensitive heat-developable copy-sheet materials. It permits the efficient application of the reducing agent and of intensifying or spectral sensitizing dyes or other components simultaneously with the halide ion. The materials are deposited at the exposed surface of the organic silver salt layer where they perform most effectively in subsequent image-forming operations. In some instances the dye employed in spectrally sensitizing or otherwise modifying the sheet may itself serve as the source of a portion of the halide ion, and particularly effective results in terms of increased sensitivity to light have been attained in this manner.

The silver halide may be formed on the silver behenate or other organic silver salt prior to coating the latter on the paper or other carrier surface. As an example, halogen acid (e.g. HCl or HBBr) or other source of halide ion is mixed with the organic silver salt under conditions permitting reaction therebetween, e.g. in suspension in a volatile liquid medium.

Hydrogen chloride and hydrogen bromide are effective sources of halide ion. Various water-soluble inorganic halides are somewhat more easily handled and are equally effective; ammonium bromide has been found particularly useful since the ammonium ion is subsequently readily removable, but halides of various metals, e.g. sodium, calcium, magnesium, cobalt and zinc, are also effective. Ionizable organic halogen compounds are also useful examples being triphenylmethyl chloride, triphenylmethyl bromide, 2-bromo-2-methylpropane, 2-bromobutyric acid, 2-bromoethanol, and benzophenone dichloride.

Surprisingly, the in situ formation of the silver chloride or bromide, by reaction of halide ion with silver ions of the organic silver salt, enhances the image-forming capability of the composition enormously, and far beyond anything available by simple addition of preformed silver halide, so that true photographic or picture-taking capability is made possible. The difference is not simply a matter of degree, but involves a different structure as may be demonstrated, e.g. by electron microscopy or by other test. It has been demonstrated, for example, that mixtures of silver behenate and preformed silver bromide may be physically separated by centrifuging, whereas silver behenate containing the in situ formed silver bromide, prepared as herein described, remains essentially homogeneous under the same conditions.

In a typical instance a mixture of one-half part by weight of silver bromide and ten parts of an equimolar silver behenate-behenic acid precipitate were dispersed together in 100 parts of a mixture of equal volumes of alcohol and water by prolonged agitation in a Waring Blendor. Another mixture was prepared by first dispersing the same amount of the silver behenate-behenic acid precipitate in the solvent mixture and then adding an amount of HBr sufficient to form one-half part of silver bromide, with continued agitation. Equal small portions of the two mixtures were centrifuged, and the sediment then exposed to strong ultraviolet light. The first tube showed clear evidence of separation; and small amount of dense black material occupied the tip of the tube, above which was a much larger amount of a much lighter yellowish material. The entire amount of solid material accumulated in the second tube was of uniform black color, indicating a complete lack of separation. The remainders of the two mixtures were allowed to stand for a few hours under diffuse (northern exposure) sunlight. The suspension containing the preformed silver bromide remained visibly unchanged, whereas the suspension containing the in situ formed silver bromide darkened extensively and uniformly.

In probable explanation of this effect it is suggested that the molecules of silver soap are disposed in each small particle with their silver ions associated together in distinct planes or layers. The hydrophilic polar silver ions are oriented toward each other, the planes of silver ions being separated from other adjacent planes, e.g. by the intervening extended organic radicals of the molecules. Conversion of some few of the silver ions of the silver soap from each particle to very small crystals of silver halide then occurs. The resulting silver halide crystals are in synergistic association with the silver ions of the remaining silver soap. Exposure to light causes photolytic reduction at the silver halide crystal and provides a silver nucleus in position to permit electron migration to the remaining silver ions under the influence of heat. These silver nuclei then catalyze the reduction of the organic silver soap by the organic reducing agent at the elevated temperature employed, to produce a visible change. The nature of the silver halide crystal, its close proximity to the silver soap, and the presence of silver halide crystals in synergistic association with each of the silver soap particles, combine to provide high light sensitivity and the ability to form exceptionally dense and high contrast images upon moderate heating, after light exposure.

In any event, and regardless of theory, the organic silver salt coatings containing in situ formed silver halide have been found to have orders-of-magnitude greater image-forming capability when exposed to a light-image and then developed by heating, e.g. to yield images of far greater contrast or to require far less light-exposure in forming a dense image, than identically exposed and heated coatings containing identical proportions of physically added silver halide.

Opaque sheet materials made in accordance with this invention, when exposed to 10 times the quantity of radiation required to provide an image in the radiation-struck area having a diffuse reflection optical density of 0.1 above background upon heat development for example at 215° F. for 2 seconds, provide an optical density upon identical heat development of at least about 0.6 above background. The density measurements are conveniently made using a conventional reflectometer, such as a Photovolt Corporation Photometer Model 520M with a Model 53 reflection attachment, for determining the reflection density.

Transparent sheet materials made in accordance with this invention, when exposed to 10 times the quantity of radiation required to provide an image in the radiation-struck area having a diffuse transmission optical density of 0.1 above background upon heat development e.g. at 215° F. for 2 seconds, provide upon identical heat development an image having a density of at least about 1.0 above background. The measurements are made using a conventional densitometer, such as MacBeth Corporation "Quantalog" Model No. TD102, for determining diffuse transmission optical density.

These characteristics may be conveniently expressed in terms of gamma infinity values obtained, as in conventional photographic practice, by step-wise or sensitometric exposure followed by development to maximum contrast. Under such procedures the sheet materials of the invention show a gamma infinity value of at least about 0.5.

As is well understood in the photographic arts, in measuring the relationship between density and exposure, when density is plotted against the logarithm of exposure to produce the characteristic or D-log E curve, the slope of the straight line portion of the curve (i.e. the slope of the tangent to the curve at the point of inflection) is referred to as gamma ($\gamma$). See pages 73 and 437–439 of "The Theory of the Photographic Process," 3rd Ed., by Mees and James; a like discussion also occurs in the 2nd Edition of the same book, published in 1954.

For a step-wise or other sensitometric exposure, i.e. to light or actinic radiation, of a sensitive sheet there is a maximum gamma value which can be obtained with optimum development. This is referred to as "gamma infinity," as discussed at page 439 of the aforesaid book by Mees and James. For example, upon development of one of our sensitometrically exposed sheets at a specific elevated temperature, over a certain period of time, certain development is attained, which can be expressed or shown as a D-log E curve. Development for the same time at a higher temperature of another sample of the same sensitometrically exposed sheet can be expressed as a different D-log E curve having a different gamma; and so on. Likewise a series of D-log E curves may be prepared by maintaining a constant development temperature and heating for different lengths of time. The highest gamma obtainable by optimum selection of time and temperature development conditions, of a sensitometrically exposed sheet, is referred to herein as gamma infinity.

The photosensitive silver salt material may be incorporated in a transparent self-supporting film, or in a fibrous web in the substantial absence of binder, or preferably in a coating of a film-forming binder on a heat-resistant carrier such as paper, plastic film, metal foil, or glass plate. Suitable film-forming binders include such materials as polyvinyl butyral, polymethyl methacrylate, cellulose acetate, polyvinyl acetate, cellulose acetate propionate, cellulose acetate butyrate.

Mild organic reducing agents are included with the organic silver salt material. An outstandingly useful example is hydroquinone. Methylhydroxynaphthalene, methyl gallate, catechol, phenylene diamine, p-amino-phenol, and phenidone are other examples of mild reducing agents which have been found useful in the practice of the invention. Since stability of such systems is improved under acidic conditions, it is found desirable to incorporate small proportions of acidic stabilizer materials. Succinic acid is a preferred example. Benzoic acid and salicylic acid are also useful.

Spectrally sensitizing dyes are well known in the photographic industry for increasing the sensitivity of the silver halide photographic emulsion to visible light of various wavelengths. The same dyes provide similar effects in the practice of the present invention. One such dye is "Phosphine R," Color Index Basic Orange 14. Another is "Dynacolor R–81" merocyanine sensitizing dye, which is 3-allyl-5-[3-ethyl-(2-naphthoxazoylidene) ethylidene]-1-phenyl-2-thiohydantoin.[1] Other useful merocyanine dyes are 3-ethyl-5-(1-methyl-2-(1-H)-pyridylidene)rhodanine and 3-ethyl-5-(3,4-dimethyl-2-(3-H)-thiazolylidene)rhodanine. Also useful as spectral sensitizers for the purposes of the invention are styryl dyes such as 2-p-dimethylaminostyryl-1-ethylpyridinium iodide, and cyanine dyes such as dicyanine, kryptocyanine and allocyanine. The dye may be omitted, particularly where exposure to ultraviolet radiation is contemplated, but dye sensitization is generally desirable in copying with radiant energy in the range of visible light.

The following examples, in which proportions are given by weight except as otherwise stated, will serve further to illustrate but not to limit the invention.

Example 1

A mixture of equimolar parts of silver behenate and behenic acid as described in U.S. Patent No. 2,910,377 is prepared by precipitation with silver nitrate from a solution of sodium behenate and behenic acid in alcohol and water. The precipitate is thoroughly washed and dried. The following composition is prepared by prolonged ball milling.

| | Parts |
|---|---|
| Silver behenate-behenic acid mixture | 7.2 |
| Zinc oxide (French process) | 12.6 |
| Polyvinyl butyral | 6.2 |
| Toluene | 74 |

The composition is uniformly spread over a surface of 45 lb. Crocker Hamilton supercalendered bleached sulfite paper at a coating weight, after drying, of one gram/sq. ft.

A second composition is prepared by mixing together

| | | |
|---|---|---|
| Hydroquinone | grams | 8.0 |
| Ammonium bromide | do | 0.2 |
| Succinic acid | do | 0.5 |
| Sensitizing dye solution (0.5 g. dye in 1 liter of acetone) | ml | 5.0 |
| Methanol, to make 100 grams. | | |

The dye employed is 3-allyl-5-[3-ethyl-(2-naphthoxazoylidene) ethylidene]-1-phenyl-2-thiohydantoin. The composition is coated over the prepared surface at a coating weight, after drying at 140° F., of 0.01 gram/sq. ft. During and following this operation the sheet is kept under total darkness.

A portion of the sheet, prepared as aforesaid, is exposed to a light-image at up to about 90 foot-candles for one second and is then heated for two seconds at 220° F. A visible reproduction of the image in the form of dense black sharply outlined image areas on a faint pink background is obtained. The gamma infinity value is at least about 0.5.

Another portion is exposed in a camera. A recognizable photographic negative representation of a landscape is obtained by exposure under bright sunlight conditions for ---
[1] Typical procedures for making such dyes are shown in JACS 73 5326–50 (1951).

one-fiftieth second at f2 followed by heating for two seconds at 220° F.

As a control experiment, the same components and procedures are used except that the ammonium bromide is omitted from the second coating. Exposure to the light-image for 20 seconds followed by heating at 200° F. for 10 seconds produces a faint gray image on a faint dirty yellow background. Longer exposure and heating periods provide no improvement. When briefly heated to temperatures in the neighborhood of 300° F. or higher, this control sheet converts to a strong yellowish brown color. It is therefore useful as a heat-sensitive copy-sheet for use in the thermographic copying process.

Other sheets are prepared similarly but with addition of silver bromide to the first coat in place of ammonium bromide in the second coat. In one instance the silver bromide is milled into the mixture during the step of ball milling; in another the silver bromide is fused with the silver behenate-behenic acid mixture prior to ball milling. In both cases, exposure for 20 seconds followed by heating at 220° F. for 10 seconds produces a faint gray image on a faint dirty yellow background, essentially identical in appearance with the image and background areas of the bromide-free control sample.

Example 2

First coating composition of Example 1 ___grams__ 100
Solution of 4 g. NH₄Br in 1 liter alcohol _____ml__ 2
Dye solution of Example 1 _____ml__ 2
Solution of hydroquinone in alcohol (8%) ___ml__ 4

The components are well mixed and the mixture coated on smooth paper and carefully dried, all under darkroom conditions. Exposure to a light-image at about 60-90 foot candles for one-tenth to one second followed by heating at 220° F. for two seconds produces a clear, sharp copy. The image areas are not quite as dense as those of the copy produced in Example 1 but the gamma infinity value is at least about 0.5.

In this example the bromide ion is present in an amount equivalent to about one-fourth mol percent based on the amount of silver salt. Substitution for the ammonium bromide of an amount of calcium bromide equivalent to about one-tenth mol percent of bromide ion results in a sheet exhibiting a gamma infinity value of 1.45 when exposed through a step wedge and heated uniformly for 6 to 9 seconds. Larger amounts of calcium bromide, such for example as required to provide as much as about ten to thirteen mol percent or even higher based on the silver salt, likewise give high gamma infinity values. Proportions higher than about ten molar percent tend to cause slight but undesirable darkening of the background under long continued exposure to sunlight and are ordinarily to be avoided.

In another modification the ammonium bromide solution is mixed directly with the dried washed precipitated silver behenate-behenic acid powder. The product is dried if desired, and is then mixed with the remaining components in the ball mill. The coated sheet prepared with such composition produces useful images which however are lower in contrast than those obtained with the product of Example 1.

In a further modification the paper is first coated with a solution of hydroquinone and polyvinyl butyral in acetone, and the remaining ingredients then supplied in one or more additional coatings as in the preceding examples. Alternatively, the hydroquinone is applied as a surface coat, thereby facilitating the formation of a reversal image.

Example 3

A mixture in acetone of silver behanate-behenic acid mixture, zinc oxide and polyvinyl butyral in the proportions indicated in Example 1 is coated uniformly on smooth-surfaced bleached sulfite paper and dried at moderately elevated temperature. The dried coating weighs one gram per square foot. Over the coated surface is next applied under darkroom conditions a solution containing

| | Parts |
|---|---|
| Hydroquinone | 5 |
| Ammonium bromide | 0.05 |
| Succinic acid | 0.1 |
| Polyvinylpyrrolidone | 3 |
| Dye solution as in Example 1 | 3 |
| Methanol | To make 100 |

The sheet is again dried at moderately elevated temperatures, drying being completed by holding the web for about two seconds with its uncoated surface in contact with a flock-coated or paper-covered metal panel held at 210° F. The dry coating weight of the second coating is .05-.1 gram per sq. ft. The amount of bromide ion is about .9-1.8 molar percent of the amount of silver.

The resulting sheet is particularly useful as a print paper for making enlargements from microfilm negatives by the process of dry photography. As an example, sheets of the coated paper are exposed in a projection system through a microfilm negative to light from a 500-watt tungsten filament lamp at an enlargement of thirteen diameters and the prints are developed by heating for two seconds at 215±5° F. At an exposure time of two seconds a permanent positive high contrast print is obtained upon heat development having dense black image areas. At one second exposure time the image areas are less dense. An exposure time of four seconds also results in dense black image areas, but with some darkening at the background areas, upon heat development.

The sheet is also useful in the direct preparation of photographic negatives from which positive prints are easily and quickly made. As an example, the sheet is loaded into a camera, focused on a subject at a distance of six feet, and exposed at a lens setting of f2 with flash exposure from a single No. 50 flash bulb in a reflector held adjacent the camera. Development for two seconds at 220° F. produces a fully recognizable negative reproduction of the subject, from which a positive print is readily prepared by the procedure to be described in connection with Example 4.

Example 4

A copy-sheet prepared as in Example 1, or alternatively with the hydroquinone as a separate surface coating, is first exposed to a light-image and heated to form a visible reproduction, the light-struck areas being converted to an intense black.

A receptor sheet is separately prepared using the procedures and compositions as described in Example 1 except that the hydroquinone is omitted. The sheet is uniformly exposed to light.

The imaged copy-sheet is placed in face-to-face contact with the exposed receptor sheet and the composite is heated for two seconds at 220° F. A copy is produced on the receptor sheet in which the color values are again reversed, i.e. the areas corresponding to the initial light-image now appear light against a dark background. Two or more copies are produced by this method using the same imaged copy-sheet with fresh receptor sheets. The depleted copy-sheet is found to be incapable of undergoing further darkening when exposed to light at background areas and then heated at 220° F.

Example 5

A copy-sheet is prepared and tested as described under Example 1 with the exception that 0.01 gram of ammonium iodide is added to the second coating composition prior to application. The copy-sheet has increased photosensitivity as compared with the sheet of Example 1.

Sheets prepared with ammonium iodide as the sole source of halide ion are less photosensitive than those made with ammonium bromide.

Example 6

Silver behenate is prepared by precipitation from aqueous sodium behenate solution with an equimolar amount of silver nitrate. The precipitate is washed thoroughly and dried, and 14 parts of the dry powder is dispersed in 50 parts of a mixture of equal parts of toluene and methylethylketone and homogenized by forcing through an orifice. To the slurry is added 5 parts of polyvinyl butyral in an additional 50 parts of the solvent mixture.

The composition is applied to 3-mil (.003 inch) "Mylar" polyester film and dried. The smooth uniform transparent coating weighs one gram per sq. ft.

Under darkroom conditions, a second coating is next applied of a composition containing 8 grams hydroquinone, 0.45 gram ammonium bromide, 20 ml. of a solution of one-half gram of the merocyanine dye of Example 1 in one liter of methanol, and sufficient methanol to make 100 grams. The weight of the residue after drying for two minutes at 140–145° F. is 0.01 gram/sq. ft.

Exposure of the coated sheet to visible light from a tungsten filament lamp source and at an intensity of about 180 foot candles for less than one second, followed by heating for about two seconds at about 220° F., produces a darkening at exposed image areas from an initial density of about 0.05 to a final density of at least about 1½–2.

Exposure to visible light under room temperature conditions causes a gradual increase in background density to a maximum of 0.1–0.25. When first exposed, the background areas become rapidly heat-sensitive and will darken to a final density of 1½–2 on brief heating. However after prolonged exposure the sheet is found to become desensitized and to remain essentially unchanged when subjected to brief heating.

Desensitizing may alternatively and preferably be accomplished by chemical treatment. As an example, a copy which has just been prepared by exposure to a light image followed by heating is surface treated with a one percent solution of phenylmercaptotetrazole in methanol, e.g. by lightly swabbing with a pledget of cotton moistened with the solution. After drying, the background areas are found to be no longer capable of darkening when exposed and heated. The image areas remain unchanged. A one percent solution of trichloromelamine in methanol also produces a desensitizing effect.

Example 7

A self-desensitizing capability may be incorporated in the copy-sheet. Benztriazole in powder form is gently rubbed into the sensitized surface of the copy-sheet of Example 1 which is then light-exposed and heat-developed as previously described. The sheet is darkened at the light-struck areas. At background areas the sensitivity of the sheet to further exposure to light and heat is greatly reduced or eliminated. The same effect is obtained with phenylmercaptotetrazole.

Example 8

Silver phthalate is prepared by slow addition of a dilute aqueous solution of 20.5 grams of silver nitrate to a solution containing 20 grams of phthalic acid in one liter of water to which is added just sufficient ammonium hydroxide to dissolve the acid. The white flocculent precipitate is recovered, washed with water and with acetone, and dried. A ten gram portion is thoroughly dispersed in 150 ml. of methyl isobutyl ketone by mixing in a Waring Blendor, and 0.2 gram of calcium bromide is then added and mixing continued for an additional ten minutes. Further additions of 20 grams of polyvinyl butyral resin and 20 ml. of dye solution containing 0.5 gram of spectral sensitizing dye in 1000 ml. of acetone complete the formulation. The mixture is applied with a coating knife to transparent polyester film base as a uniform coating at a wet thickness of six mils. The coating is dried and is then top-coated at a thickness of two mils with a solution containing 10 grams of polyvinyl butyral, 16 grams of ditertiarybutyl phenol reducing agent, and 4 grams of phthalazinone toner in a mixture of 150 grams of methyl isobutyl ketone and 40 grams of methanol. After further drying at room temperature the sheet is exposed to a light-image from a tungsten filament source at up to 160 foot candle seconds and then heated uniformly at 260° F. for 60 seconds to obtain optimum development of the visible image. A gamma infinity value of 0.7 is obtained.

Example 9

A paper backing is smoothly coated with a first coating at a coating weight, after drying, of 1.25 grams/sq. ft. and with a second coating at a dry weight of 0.30 gram/sq. ft. to produce a light-sensitive heat-developable sheet material having particular utility in the recording of full size light-images from microfilm transparencies. Sensitivity is improved in some instances by heating, e.g. for 5 minutes at 150° F. or two seconds at 210° F. Exposures of up to 200 foot-candle-seconds followed by uniform heating at 215° F. to optimum contrast produces copies having good contrast; the sheet has a gamma infinity value of at least about 1.8–2.0.

The composition used as the first coating contains the following components in the indicated weight proportions:

| | |
|---|---:|
| Silver stearate (half soap) | 8.20 |
| Zinc oxide | 14.30 |
| Polyvinyl butyral | 7.00 |
| Toluene | 20.50 |
| Acetone | 50.00 |

The second coating is formulated to contain:

| | |
|---|---:|
| Polyvinyl pyrrolidone | 3.0 |
| Silica powder | 2.0 |
| Hydroquinone | 5.25 |
| Ammonium bromide | .06 |
| Succinic acid | .2 |
| Methanol | 90 |
| Spectral sensitizer of Example 1 | .0015 |
| Acetone (solvent for dye) | 3 |

The ammonium bromide amounts to approximately four molar percent of the silver stearate.

Since the first coatings of copy-sheets such as those of Example 1 are not of themselves sensitive to light and heat, such coatings may be sensitized, light-exposed and heat-developed over restricted areas as desired. By applying the coating to a temporary carrier sheet or film from which it may easily be removed by stripping, there is made available a transfer material with which heat-developed images may be transferred to other surfaces. For this purpose a thermoplastic resin may be employed as the binder or as a surface coating, or a thin coating of pressure-sensitive adhesive may be applied over the sensitized area.

The relative amounts of the several components may vary within rather wide limits in the construction of fully effective copy-sheets of the invention, as will be indicated in terms of the specific components employed in Example 1. The silver behenate-behenic acid mixture must be present to the extent of about 0.1 grams/sq. ft. in order to provide a readily visible image. Approximately 0.3 gram/sq. ft. is preferred as providing a desirably dense image at minimum cost, although up to .9 gram/sq. ft. has been found acceptable. Zinc oxide is added as a whitening agent and is found to be helpful in obtaining uniform dispersion and smooth coating. Another useful filler is titanium dioxide. Such materials are ordinarily omitted when a transparent coating is desired. More than about two grams/sq. ft. of zinc oxide causes excessive image dilution. The amount of polymeric or film-forming binder should be sufficient to prevent chalking or flaking of the coating but not so much as to impair image density or chemical reactivity. Between about one-twentieth and about two-thirds gram per sq. ft. is a particularly useful range for this component.

The amount of hydroquinone or other mild reducing agent for the silver ion may be stoichiometrically equivalent to the amount of silver ion but such ratio is not required except that sufficient of the reducing agent must be made available to provide a visible change. For the preferred coating weight of 0.3 gram of silver behenate-behenic acid mixture per sq. ft. of coating, hydroquinone in an amount of about 0.01 gram is preferred, but amounts of from about .002–.03 gram have been found acceptable.

Trace amounts of ammonium bromide produce noticeable sensitivity to actinic radiation, and the sensitivity appears to increase with increased amounts up to at least about .001–.002 gram/sq. ft. based on .3 gram/sq. ft. of the silver behenate-behenic acid mixture. A useful range of halide ion to be incorporated in catalytic proximity with the organic silver salt, as exemplified in the illustrative examples, is between about one-tenth or preferably about one-fourth molar percent, and about thirteen or preferably about ten molar percent, based on the amount of said salt. For many commercial products the range is within the much narrower limits of about two to about five molar percent.

Development to a visible image is accomplished in the examples simply by uniformly heating the exposed sheet, typically at 220° F. for two seconds. One convenient method of heating involves pressing the sheet against a uniformly heated flat or rounded metal platen; but heating on metal rolls, or with the sheet suspended in an oven, or in any other way is equally effective. Temperatures somewhat lower or higher than 220° F. are equally useful providing sufficient speed of reaction is obtained and without darkening of the unexposed areas by the thermographic reaction.

What is claimed is as follows:

1. Sheet material useful in imaging by a process involving exposure to a light-image followed by uniform heating and including a stratum containing (a) photosensitive silver halide catalyst-forming means and (b) heat-sensitive reactant image-forming means including an organic silver salt oxidizing agent and a reducing agent for silver ion, the oxidation-reduction reaction of which to produce a visible change is accelerated by said catalyst; said stratum being further characterized in that a sufficient quantity, of at least about one-tenth mol percent based on said organic silver salt, of said photosensitive means is in catalytic proximity with a sufficient proportion of said heat-sensitive means to provide a garra to infinity value of at least about 0.5 when said stratum is exposed image-wise to said light-image and the image is then developed by uniform heating.

2. Sheet material useful in imaging by a process involving exposure to a light-image followed by uniform heating and including a stratum containing (a) photosensitive silver halide catalyst-forming means and (b) heat-sensitive reactant image-forming means including (1) a water-insoluble silver salt of a long chain fatty acid as an oxidizing agent, and (2) a reducing agent for silver ion, the oxidation-reduction reaction of which to produce a visible change is accelerated by said catalyst; said stratum being further characterized in that a sufficient quantity, of at least about one-fourth mol percent based on said fatty acid silver salt, of said photosensitive means is in catalytic proximity with a sufficient proportion of said heat-sensitive means to provide a gamma infinity value of at least about 0.5 when said stratum is exposed image-wise to said light-image and the image is then developed by uniform heating.

3. Sheet material of claim 2 wherein said silver halide comprises silver bromide.

4. Sheet material of claim 1 wherein said quantity of photosensitive means is between about one-fourth and about ten molar percent.

5. Sheet material of claim 2 wherein said quantity of photosensitive means is between about two and about five molar percent.

6. Sheet material of claim 2 wherein is incorporated a spectrally sensitizing dye.

7. Sheet material of claim 2 wherein is incorporated a toner for the silver image.

8. Sheet material of claim 2 wherein said stratum is supported on a thin backing.

9. Sheet material of claim 8 wherein said stratum and said backing are transparent.

10. Sheet material of claim 2 wherein the silver halide comprises silver bromide and there is included in said stratum a spectrally sensitizing dye.

11. Sheet material of claim 10 wherein there is included in said stratum a toner for the silver image.

12. Sheet material of claim 10 wherein the fatty acid silver salt comprises silver behenate.

13. In the manufacture of the sheet material of claim 2, the method comprising mixing with said fatty acid silver salt a source of halide ions under conditions permitting reaction therebetween, with formation of said silver halide catalyst-forming means.

14. The method of claim 13 wherein said source of halide ions is applied to a preformed stratum of said silver salt.

15. The method of claim 14 wherein said reducing agent is applied simultaneously with said source of halide ions.

16. The method of claim 13 wherein said source of halide ions is mixed with said silver salt prior to formation of said stratum.

17. The method of claim 13 wherein said halide ions comprise bromide ions and wherein the amount of available bromide ion is at least about one-fourth mol percent of the amount of said organic silver salt.

18. Sheet material useful in imaging by a process involving exposure to a suitable light-image followed by uniform heating and including a stratum containing (a) photosensitive silver halide catalyst-forming means and (b) normally stable heat-sensitive reactant image-forming means including (1) a water-insoluble long chain fatty acid silver salt oxidizing agent and (2) a reducing agent for silver ion, the oxidation-reduction reaction of which to produce a visible change is accelerated by said catalyst; said stratum being further characterized in that a sufficient quantity, of at least about one-tenth mol percent based on said oxidizing agent, of said photosensitive silver halide catalyst-forming means is the reaction product of said fatty acid silver salt and a source of halide ions, with said silver halide being in synergistic association with said fatty acid silver salt of said heat-sensitive means, whereby when said stratum of said sheet is exposed image-wise to said light-image and at least a portion of the silver halide at image areas is thus converted to silver in catalytic proximity with the long chain fatty acid silver salt of the said heat-sensitive image-forming means, and when the image is then optimumly developed by heating, there is provided a dense image of high contrast with background areas of said sheet.

References Cited
UNITED STATES PATENTS 3,094,417   6/1963   Workman _____ 96—28
3,152,904   10/1964   Sorensen et al. _____ 96—94

J. TRAVIS BROWN, Primary Examiner

U.S. Cl. X.R.

96—94, 102